US008897718B2

(12) United States Patent
Manea et al.

(10) Patent No.: US 8,897,718 B2
(45) Date of Patent: *Nov. 25, 2014

(54) METHOD AND SYSTEM FOR ADAPTIVE CODING AND MODULATION (ACM) FOR SUPPORTING MESH NETWORK CONNECTIVITY FOR MULTIPOINT NETWORKS

(71) Applicant: Comtech EF Data Corp., Tempe, AZ (US)

(72) Inventors: Vasile Manea, Potomac, MD (US); Michael Beeler, Jefferson, MD (US); Frederick Morris, Gaithersburg, MD (US); Jeffery Harig, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,265

(22) Filed: May 6, 2014

(65) Prior Publication Data

US 2014/0243031 A1    Aug. 28, 2014

Related U.S. Application Data

(63) Continuation of application No. 13/408,901, filed on Feb. 29, 2012, now Pat. No. 8,718,569.

(60) Provisional application No. 61/552,233, filed on Oct. 27, 2011.

(51) Int. Cl.
| | | |
|---|---|---|
| *H04B 1/00* | (2006.01) | |
| *H04B 7/00* | (2006.01) | |
| *H04W 76/02* | (2009.01) | |
| *H04W 72/04* | (2009.01) | |
| *H04B 7/185* | (2006.01) | |
| *H04L 1/00* | (2006.01) | |
| *H04W 28/18* | (2009.01) | |
| *H04W 48/16* | (2009.01) | |
| *H04W 84/06* | (2009.01) | |

(52) U.S. Cl.
CPC .............. *H04W 76/02* (2013.01); *H04W 72/04* (2013.01); *H04B 7/18515* (2013.01); *H04B 7/18582* (2013.01); *H04L 1/0003* (2013.01); *H04L 1/0009* (2013.01); *H04W 72/0406* (2013.01); *H04W 28/18* (2013.01); *H04W 48/16* (2013.01); *H04W 84/06* (2013.01)
USPC ............. 455/69; 370/312; 370/319; 370/321; 370/349

(58) Field of Classification Search
CPC . H04W 72/04; H04W 72/0406; H04W 76/02; H04W 28/18; H04W 48/16; H04W 84/06; H04B 7/18515; H04B 7/18582; H04L 1/0003; H04L 1/009
USPC .......... 455/69, 12.1, 427, 67.13, 509, 13.4, 7; 370/312, 319, 335, 321, 323, 349
See application file for complete search history.

(56) References Cited

U.S. PATENT DOCUMENTS 6,233,429 B1 *  5/2001  Soffer et al. ................. 455/12.1
7,215,648 B2 *  5/2007  Sullivan ....................... 370/278
(Continued)

*Primary Examiner* — Marceau Milord
(74) *Attorney, Agent, or Firm* — Booth Udall Fuller, PLC

(57) ABSTRACT

A method of provisioning a communications link between remote terminals within a hub-spoke network comprising receiving, by a first remote terminal, information about a second remote terminal from a hub, selecting, by the first remote terminal, a modulation factor, coding rate, symbol rate, center frequency, and power level based on the information received about the second remote terminal, transmitting, by the first remote terminal, a signal using at least one of the selected modulation factor, coding rate, symbol rate, center frequency, and power level, to the second remote terminal such that a communications link is created, and adjusting the modulation factor, coding rate, symbol rate, center frequency, or power level of the transmitted signal such that performance of the link is increased while maintaining a presence of the link.

48 Claims, 11 Drawing Sheets

(56) References Cited

U.S. PATENT DOCUMENTS

| | | | |
|---|---|---|---|
| 7,443,920 B2 * | 10/2008 | Thesling et al. | 375/269 |
| 7,515,566 B2 * | 4/2009 | Dale et al. | 370/336 |
| 7,693,245 B2 * | 4/2010 | Thesling et al. | 375/362 |
| 8,131,212 B2 * | 3/2012 | Laufer | 455/13.4 |
| 8,135,431 B2 * | 3/2012 | Laish et al. | 455/522 |
| 8,306,155 B2 * | 11/2012 | Thesling et al. | 375/326 |
| 8,718,569 B2 * | 5/2014 | Manea et al. | 455/69 |
| 2005/0122912 A1 | 6/2005 | Jeon et al. | |
| 2009/0161598 A1 | 6/2009 | Dale et al. | |
| 2009/0175185 A1 | 7/2009 | Laish et al. | |
| 2011/0194587 A1 | 8/2011 | Ram | |

\* cited by examiner

| MODCOD | MODULATION INDEX | FEC RATE | Eb/No | Es/No |
|---|---|---|---|---|
| 0 | 1 (BPSK) | 0.488 | 2.400 | -0.716 |
| 1 | 2 (QPSK) | 0.533 | 2.200 | 2.478 |
| 2 | 2 (QPSK) | 0.631 | 2.800 | 3.811 |
| 3 | 2 (QPSK) | 0.706 | 3.300 | 4.798 |
| 4 | 2 (QPSK) | 0.803 | 3.800 | 5.857 |
| 5 | 3 (8-QAM) | 0.642 | 4.600 | 7.447 |
| 6 | 3 (8-QAM) | 0.711 | 5.200 | 8.490 |
| 7 | 3 (8-QAM) | 0.780 | 5.600 | 9.292 |
| 8 | 4 (16-QAM) | 0.731 | 6.300 | 10.954 |
| 9 | 4 (16-QAM) | 0.780 | 7.000 | 11.942 |
| 10 | 4 (16-QAM) | 0.829 | 7.500 | 12.706 |
| 11 | 4 (16-QAM) | 0.853 | 8.000 | 13.330 |

FIG. 11

METHOD AND SYSTEM FOR ADAPTIVE CODING AND MODULATION (ACM) FOR SUPPORTING MESH NETWORK CONNECTIVITY FOR MULTIPOINT NETWORKS

CROSS REFERENCE TO RELATED APPLICATIONS

This document is a continuation of U.S. application Ser. No. 13/408,901 entitled "A Method and System for Adaptive Coding and Modulation (ACM) for Supporting Mesh Network Connectivity for Multipoint Networks" to Vasile Manea et al., which was filed on Feb. 29, 2012, which application claims the benefit of the filing date of U.S. Provisional Patent Application No. 61/552,233, entitled "A Method and System for Adaptive Coding and Modulation (ACM) for Supporting Mesh Network Connectivity for Multipoint Networks" to Vasile Manea et al., which was filed on Oct. 27, 2011, the disclosures of which are hereby incorporated entirely by reference herein.

BACKGROUND

1. Technical Field

Aspects of this document relate generally to telecommunication systems and techniques for transmitting data across a telecommunication channel.

2. Background Art

Point-to-multipoint Very Small Aperture Terminal (VSAT) networks are conventionally designed for operation as a hub-spoke configuration wherein a hub comprises a large earth station with expensive high-powered amplifiers and extremely sensitive receiving electronics supporting many remote locations that are comprised of smaller antennas having low-cost electronics. The result is that communications are only supported from the hub to the remotes and from the remotes to the hub. Overcoming link conditions due to path loss and the low power amplifiers associated with remote VSAT sites make it difficult for a remote site to close the link to another remote site, e.g. the remote sites in a VSAT network are typically designed to communicate only with the hub earth station.

So as to reduce the complexity and length of the Detailed Specification, and to fully establish the state of the art in certain areas of technology, Applicants herein expressly incorporate by reference all of the following materials identified in each numbered paragraph below.

U.S. Pat. No. RE41,218E entitled "Demand-based Connection Management Integrated Services Access Terminal (ISAT) for Satellite Communications System" to Fielding, et al., reissued Apr. 13, 2010.

U.S. Pat. No. 7,321,572 entitled "Frame Relay Protocol-Based Multiplex Switching Scheme for Satellite Mesh Network" to Fielding, et al., issued Jan. 22, 2008.

U.S. Pat. No. 6,771,617 entitled "Frame Relay Protocol-based Multiplex Switching Scheme for Satellite Mesh Network" to Fielding, issued Aug. 3, 2004.

U.S. Pat. No. 6,233,429 entitled "VSAT Satellite Telecommunications System" to Soffer, et al., issued May 15, 2001.

Applicants believe that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicants will amend the specification to expressly recite the essential material that is incorporated by reference as allowed by the applicable rules.

SUMMARY

Implementations of a method of provisioning a communications link between remote terminals within a hub-spoke network may comprise receiving, by a first remote terminal, information about a second remote terminal from a hub, selecting, by the first remote terminal, a modulation factor, coding rate, symbol rate, center frequency, and power level based on the information received about the second remote terminal, transmitting, by the first remote terminal, a signal using at least one of the selected modulation factor, coding rate, symbol rate, center frequency, and power level, to the second remote terminal such that a communications link is created, and adjusting the modulation factor, coding rate, symbol rate, center frequency, or power level of the transmitted signal such that performance of the link is increased while maintaining a presence of the link.

Particular implementations may comprise one or more of the following features. Outbound communications from the hub may natively exist between the hub and one or more remote terminals. Inbound communications received by the hub may natively exist between one or more remote terminals and the hub. The method may further comprise transmitting, by the first remote terminal, a signal to the hub, and adjusting, by the first remote terminal, a modulation factor, coding rate, symbol rate, center frequency, or power level such that a communications link is created between the first and second remote terminals. The second remote terminal may further comprise a dedicated receiving circuit configured to receive the signal from the first remote terminal. The second remote terminal may further comprise a dedicated receiving device configured to receive the signal from the first remote terminal. The second remote terminal may further comprises a channelized or adaptive coding and modulation (ACM) receiving circuit configured to receive the signal from the first remote terminal. The adjustment may utilize an adaptive coding and modulation format. A symbol rate and bandwidth of the transmitted signal may remain constant. The method may further comprise transmitting a complete data message from the first remote terminal to the second remote terminal using a constant modulation factor, coding rate, center frequency, and power level during the transmission. The method may further comprise periodically changing the modulation factor, coding rate, center frequency, and power level between a first configuration and a second configuration during transmission of a data message from the first remote terminal to the second remote terminal.

Implementations of a method of communicating between remote terminals within a hub-spoke network may comprise receiving, by a hub, information about a plurality of remote terminals indicating communications link requirements of each remote terminal, receiving, by a first remote terminal of the plurality of remote terminals, information about a second remote terminal of the plurality of remote terminals from the hub, selecting, by the first remote terminal, a modulation factor, coding rate, symbol rate, center frequency, and power level based on the information received about the second remote terminal, transmitting, by the first remote terminal, a signal using at least one of the selected modulation factor, coding rate, symbol rate, center frequency, and power level, to the second remote terminal such that a communications link is created, and adjusting the modulation factor, coding rate, symbol rate, center frequency, or power level of the transmitted signal such that performance of the link is increased while maintaining a presence of the link.

Particular implementations may comprise one or more of the following features. The method may further comprise transmitting, by the first and second remote terminals, link quality information to the hub, and determining, by the first or second remote terminal, an estimated modulation factor, coding rate, symbol rate, center frequency, and power level necessary to maintain the link between the first and second remote terminals. The method may further comprise transmitting, by the first and second remote terminals, link quality information to the hub, and determining, by the hub, an estimated modulation factor, coding rate, symbol rate, center frequency, and power level necessary to maintain the link between the first and second remote terminals. The method may further comprise storing the information received by the hub into a storage device. The method may further comprise transmitting, by the hub, information about the communication link requirements of a remote terminal to other remote terminals among the plurality of remote terminals such that each remote terminal has information about a modulation factor, coding rate, symbol rate, center frequency, and power level required to create a link between itself and another remote terminal. The method may further comprise simultaneously transmitting the signal from the first remote terminal to the second remote terminal and from the first remote terminal to the hub. The method may further comprise periodically receiving updated information about the communications link requirements of each remote terminal by the hub, and transmitting, by the hub, the updated information to the plurality of remote terminals.

Implementations of a method of communicating between remote terminals within a hub-spoke network may comprise receiving, by a hub, a request from a first remote terminal to establish a communications link with a second remote terminal, transmitting to the second remote terminal, by the hub, information regarding a modulation factor, coding rate, symbol rate, center frequency, and power level of an expected message sent from the first remote terminal to the second remote terminal, transmitting, by the first remote terminal, a signal to the second remote terminal such that a communications link is created, and adjusting the modulation factor, coding rate, symbol rate, center frequency, or power level of the transmitted signal such that performance of the link is increased while maintaining a presence of the link.

Particular implementations may comprise one or more of the following features. The method may further comprise determining by the hub which remote terminals among a plurality of remote terminals have access to establish a communications link with one or more other remote terminals within the plurality of remote terminals. The method may further comprise transmitting, by the first remote terminal, a message to the hub requesting the second remote terminal to configure a receiving circuit to receive a message from the first remote terminal and relaying, by the hub, the message to the second remote terminal. The method may further comprise transmitting, by the first remote terminal, a message to the hub requesting that two or more remote terminals among the plurality of remote terminals configure a receiving circuit to receive a message from the first remote terminal and relaying, by the hub, the message to the two or more remote terminals. The method may further comprise transmitting, by the first remote terminal, a message to the hub requesting that all of the other remote terminals among the plurality of remote terminals configure a receiving circuit to receive a message from the first remote terminal and relaying, by the hub, the message to all of the other remote terminals.

Implementations of a method of communicating between remote terminals within a hub-spoke network, may comprise transmitting, by a first remote terminal, a signal using a modulation factor, coding rate, center frequency, and power level selected based on a priori information about communications link requirements of a second remote terminal such that a communications link is created without communicating with a hub and adjusting the modulation factor, coding rate, symbol rate, center frequency, or power level of the transmitted signal such that performance of the link is increased while maintaining a presence of the link.

Implementations of a system for communicating between remote terminals within a hub-spoke network, may comprise a hub configured to transmit information about a second remote terminal and a first remote terminal configured to receive the information about the second remote terminal from the hub, select a modulation factor, coding rate, symbol rate, center frequency, and power level based on the information received about the second remote terminal, transmit a signal using at least one of the selected modulation factor, coding rate, symbol rate, center frequency, and power level, to the second remote terminal such that a communications link is created, and adjust the modulation factor, coding rate, symbol rate, center frequency, or power level of the transmitted signal such that performance of the link is increased while maintaining a presence of the link.

Particular implementations may comprise one or more of the following features. Outbound communications from the hub may natively exist between the hub and one or more remote terminals. Inbound communications received by the hub may natively exist between one or more remote terminals and the hub. The first remote terminal may be further configured to transmit a signal to the hub. The second remote terminal may further comprise a dedicated receiving circuit configured to receive the signal from the first remote terminal. The second remote terminal may further comprise a dedicated receiving device configured to receive the signal from the first remote terminal. The second remote terminal may further comprise a channelized or adaptive coding and modulation (ACM) receiving circuit configured to receive the signal from the first remote terminal. The first remote terminal may be further configured to adjust the modulation factor, coding rate, or power level using an adaptive coding and modulation format. A symbol rate and bandwidth of the transmitted signal may remain constant. The first remote terminal may be further configured to transmit a complete data message from the first remote terminal to the second remote terminal using a constant modulation factor, coding rate symbol rate, center frequency, and power level during the transmission. The first remote terminal may be further configured to periodically change the modulation factor, coding rate, symbol rate, center frequency, and power level between a first configuration and a second configuration during transmission of a data message from the first remote terminal to the second remote terminal.

Implementations of a system for communicating between remote terminals within a hub-spoke network may comprise a hub configured to receive information about a plurality of remote terminals indicating communications link requirements of each remote terminal and a first remote terminal configured to receive the information about a second remote terminal from the hub, select a modulation factor, coding rate, symbol rate, center frequency, and power level based on the information received about the second remote terminal, transmit a signal using at least one of the selected modulation factor, coding rate, symbol rate, center frequency, and power level, to the second remote terminal such that a communications link is created, and adjust the modulation factor, coding rate, symbol rate, center frequency, or power level of the transmitted signal such that performance of the link is increased while maintaining a presence of the link.

Particular implementations may comprise one or more of the following features. The first and second terminals may be further configured to transmit link quality information to the hub and determine an estimated modulation factor, coding rate, symbol rate, center frequency, and power level necessary to maintain the link between the first and second remote terminals. The system may further comprise a storage device configured to store the information received by the hub. The hub may be further configured to transmit information about the communication link requirements of a remote terminal to other remote terminals among the plurality of remote terminals such that each remote terminal has information about a modulation factor, coding rate, symbol rate, center frequency, and power level required to create a link between itself and another remote terminal. The first remote terminal may be further configured to simultaneously transmit the signal to the second remote terminal and to the hub. The hub may be further configured to periodically receive updated information about the communications link requirements of each remote terminal and transmit the updated information to the plurality of remote terminals.

Implementations of a system for communicating between remote terminals within a hub-spoke network may comprise a hub, a first remote terminal, and a second remote terminal wherein the hub is configured to receive a request from the first remote terminal to establish a communications link with the second remote terminal and transmit to the second remote terminal information about a modulation factor, coding rate, symbol rate, center frequency, and power level of an expected message sent from the first remote terminal to the second remote terminal, and wherein the first remote terminal is configured to transmit a signal using at least one of the selected modulation factor, coding rate, symbol rate, center frequency, and power level, to the second remote terminal such that a communications link is created and adjust the modulation factor, coding rate, symbol rate, center frequency, or power level of the transmitted signal such that performance of the link is increased while maintaining a presence of the link.

Particular implementations may comprise one or more of the following features. The hub may be further configured to determine which remote terminals among a plurality of remote terminals have access to establish a communications link with one or more other remote terminals within the plurality of remote terminals. At least one of the first and second terminals may be further configured to determine which remote terminals among a plurality of remote terminals have access to establish a communications link with one or more other remote terminals within the plurality of remote terminals. The first remote terminal may be further configured to transmit a message to the hub requesting the second remote terminal to configure a receiving circuit to receive a message from the first remote terminal and the hub is further configured to relay the message to the second remote terminal. The first remote terminal may be further configured to transmit a message to the hub requesting that two or more remote terminals among the plurality of remote terminals configure a receiving circuit to receive a message from the first remote terminal and the hub is further configured to relay the message to the two or more remote terminals. The first remote terminal may be further configured to transmit a message to the hub requesting that all of the other remote terminals among the plurality of remote terminals configure a receiving circuit to receive a message from the first remote terminal and the hub is further configured to relay the message to all of the other remote terminals.

Implementations of a system for communicating between remote terminals within a hub-spoke network may comprise a hub, a first remote terminal, and a second remote terminal, wherein the first remote terminal is configured to transmit a signal using a modulation factor, coding rate, and power level selected based on a priori information about communications link requirements of the second remote terminal such that a communications link is created without communicating with the hub, and wherein the first remote terminal is further configured to adjust the modulation factor, coding rate, symbol rate, center frequency, or power level of the transmitted signal such that performance of the link is increased while maintaining a presence of the link.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description, Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 11 is a representative chart of modulation and coding (MODCOD) characteristics and the resulting Eb/No and Es/No using a possible Modulation and Coding using VersaFEC.

DESCRIPTION

Figure 1:
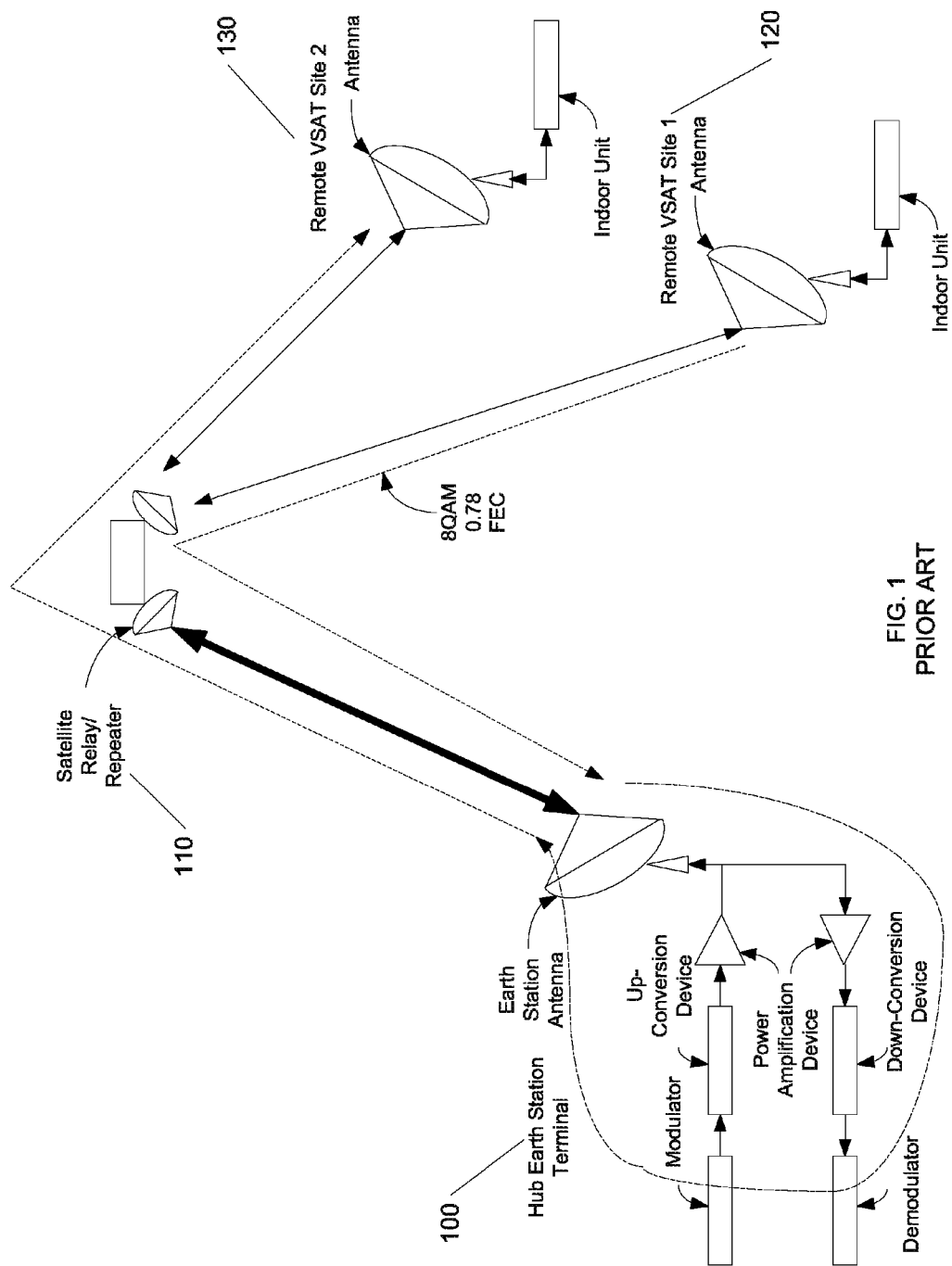
FIG. 1 is a representation of the prior art of a geographically diverse satellite network with an hub earth station terminal communicating with two geographically diverse remote terminals in which a message is required to pass through the hub earth station terminal to communicate among remote terminals.

This disclosure, its aspects and implementations, are not limited to the specific components, frequency examples, or methods disclosed herein. Many additional components and assembly procedures known in the art consistent with a method and system for adaptive coding and modulation (ACM) for supporting mesh delivery network connectivity for multipoint networks are in use with particular implementations from this disclosure. Accordingly, for example, although particular implementations are disclosed, such implementations and implementing components may comprise any components, models, versions, quantities, and/or the like as are known in the art for such systems and implementing components, consistent with the intended operation.

In places where this description refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

This disclosure relates to, but is not limited to, implementations of a method and system for ACM for supporting mesh network connectivity for multipoint networks. Providing point-to-point, point-to-multipoint, and mesh connectivity in and of itself is not a novel concept, but the described method s and systems enable mesh connectivity in a manner that has not previously been accomplished for point-to-multipoint networks by allowing hub communications to a hub earth station while simultaneously enabling remote-to-remote communications to a link that would not be otherwise capable of sustaining communications. The techniques disclosed herein may be specifically employed in satellite communications systems. However, as will be clear to those of ordinary skill in the art from this disclosure, the principles and aspects disclosed herein may readily be applied to any electromagnetic (IF, RF and optical) communications system, such as terrestrial broadcast or cellular networks without undue experimentation.

More specifically, an aspect of this disclosure relates to a method and system for ACM for supporting mesh network connectivity for multipoint networks for configurations in which the VSAT network was not specifically designed to close a link due to limitation in the size of the antenna or available power of the amplifier. Communications from a VSAT network typically fall into the following categories: Single Channel per Carrier (SCPC), Time Division Multiple Access (TDMA), Frequency Division Multiple Access (FDMA) or a combination of Frequency and Time Division Multiple Access (F-TDMA). Implementations of described methods may utilize any combination of the known access technologies, but instead of being destined to only the hub earth station, a different modulation and coding configuration (MODCOD) may be utilized in an ACM format to allow both the hub and another remote terminal to receive a transmission.

Traditionally, for point-to-multipoint networks, connectivity is established in a manner that enables communications only between the hub earth station (point) to the remote terminals (multi-points), but not between remote terminals with the exception of all communications flowing back through the hub earth station (point) that are then relayed to the remote terminals. In the art, this is known as a double-hop. Hub earth stations (point) typically have large antennas and sensitive Low Noise Amplifiers (LNA) that allow them to receive a transmission from a remote site that may contain smaller antennas and amplification devices. Additionally, the smaller antenna of the remote site precludes one site from communicating with another remote site due to the smaller antenna and the use of a less-sensitive Low Noise Block (LNB) amplifier on the receiving chain. Due to these limitations, remotes may only communicate with the hub earth station (point) and the hub earth station may only communicate with the remote terminals, but remote-to-remote communication directly between two remote terminals is not possible. Other satellite network design approaches within the current art require either a larger block upconverter or as known in the art a Block Upconverter (BUC), a larger antenna, or a combination of both to achieve the remote to remote connectivity.

One aspect of novelty in this disclosure is that while normal communications are taking place from a remote terminal to the hub earth station using a modulation and Forward Error Correction (FEC) code, a modulation and FEC code may be selected using a ACM technique that overcomes the smaller antenna and less sensitive LNB and BUC size at a remote site, thus allowing a message to be received by both the hub earth station (point) and a remote terminal, group of remote terminals or all remote terminals. Adjustment of the MODCOD may also be used to accommodate changes in traffic loading. One of ordinary skill in the art would recognize that Variable Coding and Modulation (VCM) is a subset of ACM and thus, this disclosure is not intended to limit the methods and systems described herein to only VCM as any appropriate coding and modulation type may be used.

Another aspect of novelty in this disclosure includes using the ACM coupled with a feedback mechanism for controlling access to the various remote terminals. Since the hub earth station (point) is all seeing in the sense that any and all communications may be monitored by the hub, a process may exist at the hub for sending updates to the remote terminals as to what each remote terminal's capabilities are and provide guidance to each remote terminal as to what level of MODCOD may be required to close the link. Unlike traditional ACM, implementations of the described methods do not require a traditional ACM controller. The ACM functions of implementations of the described methods only require that information relating to the current operation of the remote terminals such as, but not limited to at least one of center frequency, symbol rate, coding rate, modulation factor, power level, and the like, is collected and provided to every remote terminal participating in the remote-to-remote method of communication. The ACM trigger used may be based on traffic destined for the IP address of the remote terminal, in addition to the condition of the satellite link. Taking this a step further, an entire access technique may be established known as MODCOD Division Multiple Access (MDMA), in which each remote terminal can communicate with any one or more hub earth stations and one or more remote terminals as a full mesh architecture.

FIG. 1 shows a typical satellite configuration with three sites, wherein a hub earth station 100 is communicating over a satellite repeating relay 110 to two geographically diverse remote terminals 120, 130. As is shown in FIG. 1, the hub earth station 100 may have larger and more sensitive electronics than the remote sites. In this configuration, remote VSAT 1 120 has a message that needs to be passed to remote VSAT 2 130. Since point-to-multipoint networks are not traditionally designed to enable remote terminals 120, 130 to communicate directly with one another, the communications must flow from the source 120 (remote VSAT 1) to the hub earth station 100, where they are related to the destination 130 (remote VSAT 2). In the art, this is known as a double hop, since the message must pass over the satellite 110 two times because it must flow through the earth station hub 100 in both directions.

Figure 2:
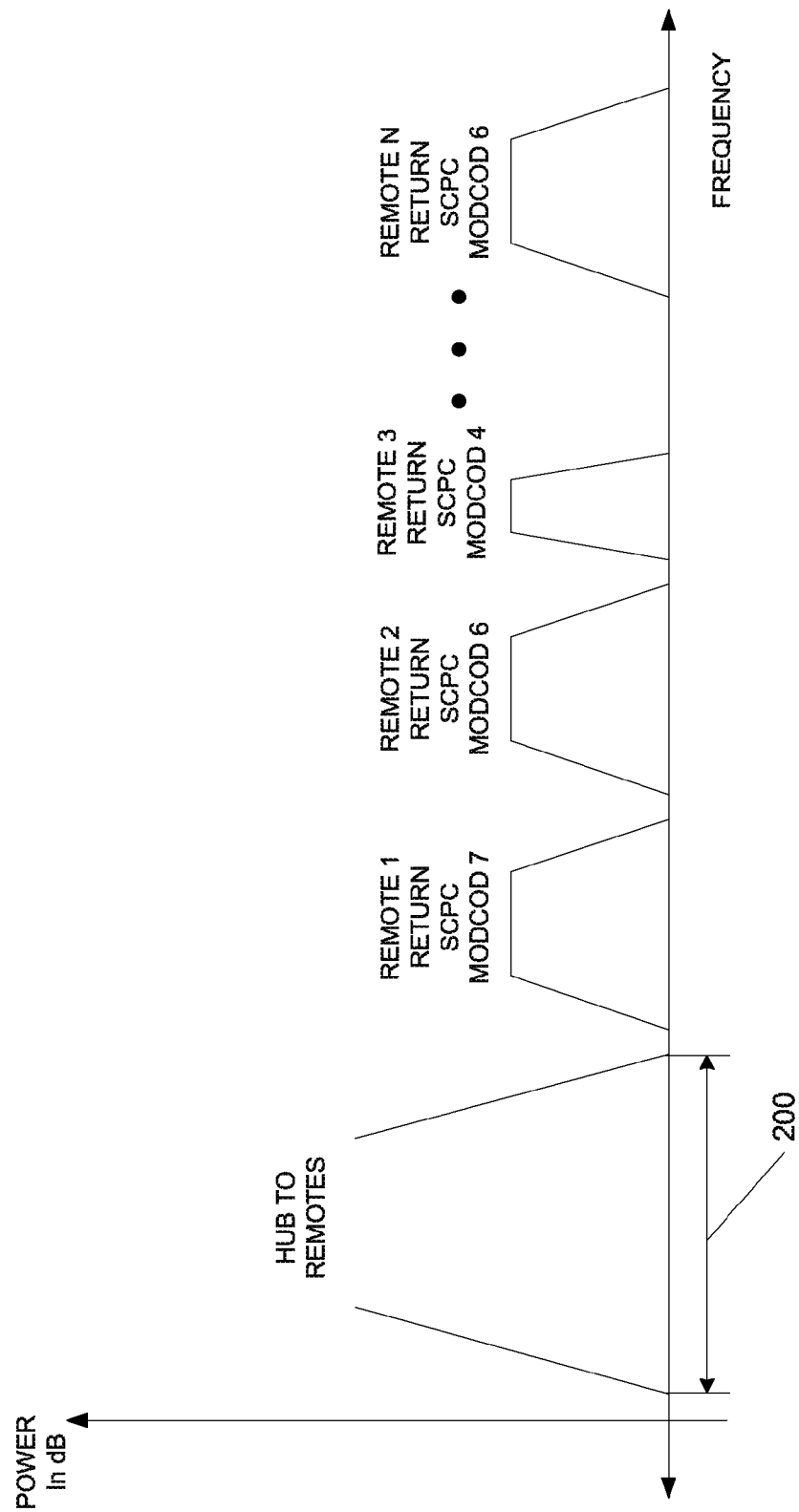
FIG. 2 is a representation of the prior art and spectrum required to support a common hub earth station communicating with remote terminals and a dedicated SCPC Continuous Coding and Modulation (CCM) return channel requiring communications to flow through the hub earth station to another remote.

FIG. 2 shows an example of the associated spectrum for a hub earth station (common outbound) communicating to all remote terminals in a network. As shown, there is a dedicated spectrum 200 in which remote VSAT 1 and remote VSAT 2 communicate directly with the hub earth station. Additionally, as can be observed in FIG. 2, the power level of remote VSAT 1 and remote VSAT 2 is lower, so a larger antenna and more sensitive electronics are required to receive a message from these lower powered remote terminals. In this point-to-multipoint configuration, only the hub earth station has an antenna and has electronics capable of receiving messages from the remote VSAT sites.

Figure 3:
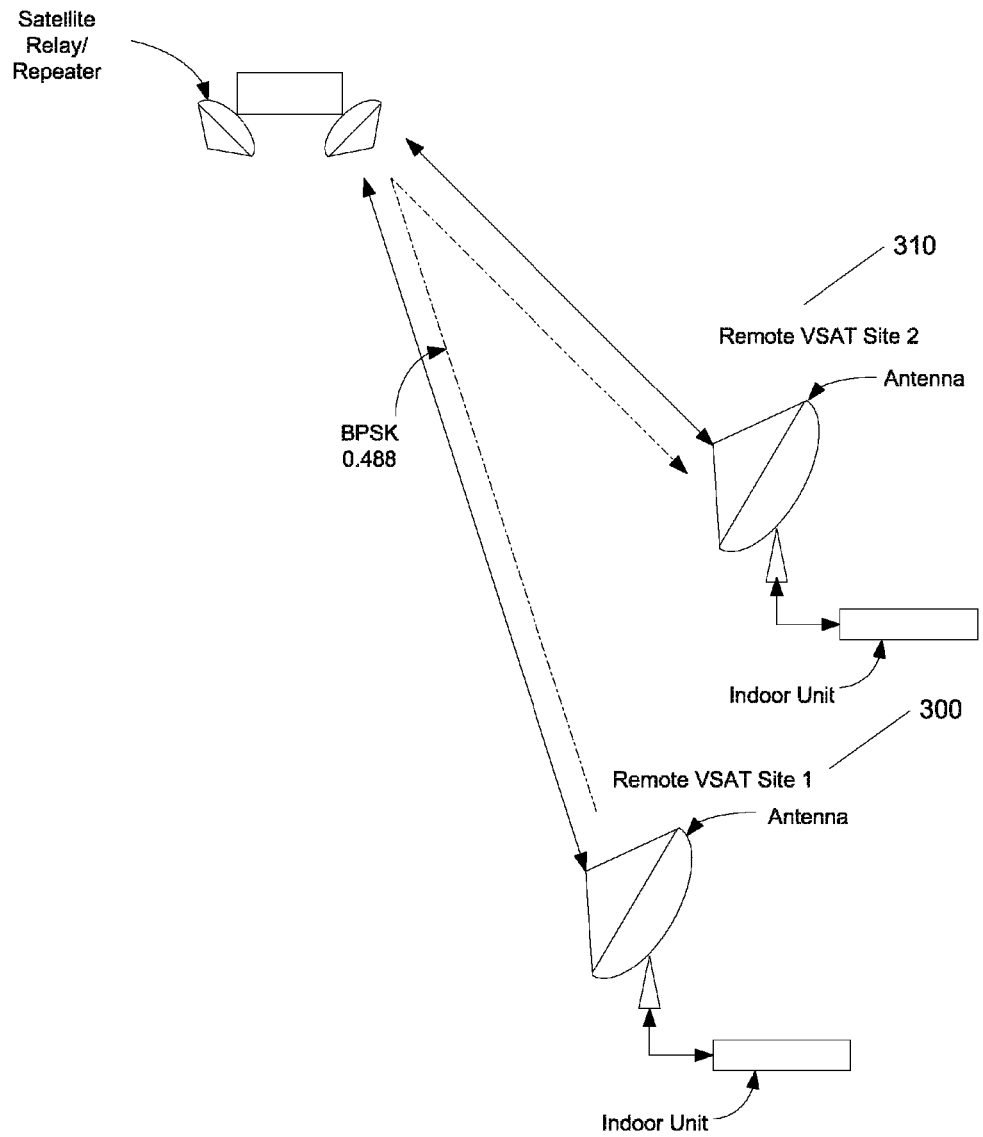
FIG. 3 is a representation of the prior art showing two remotes with larger antennas and amplifiers configured for CCM to allow remote-to-remote communications.
Figure 4:
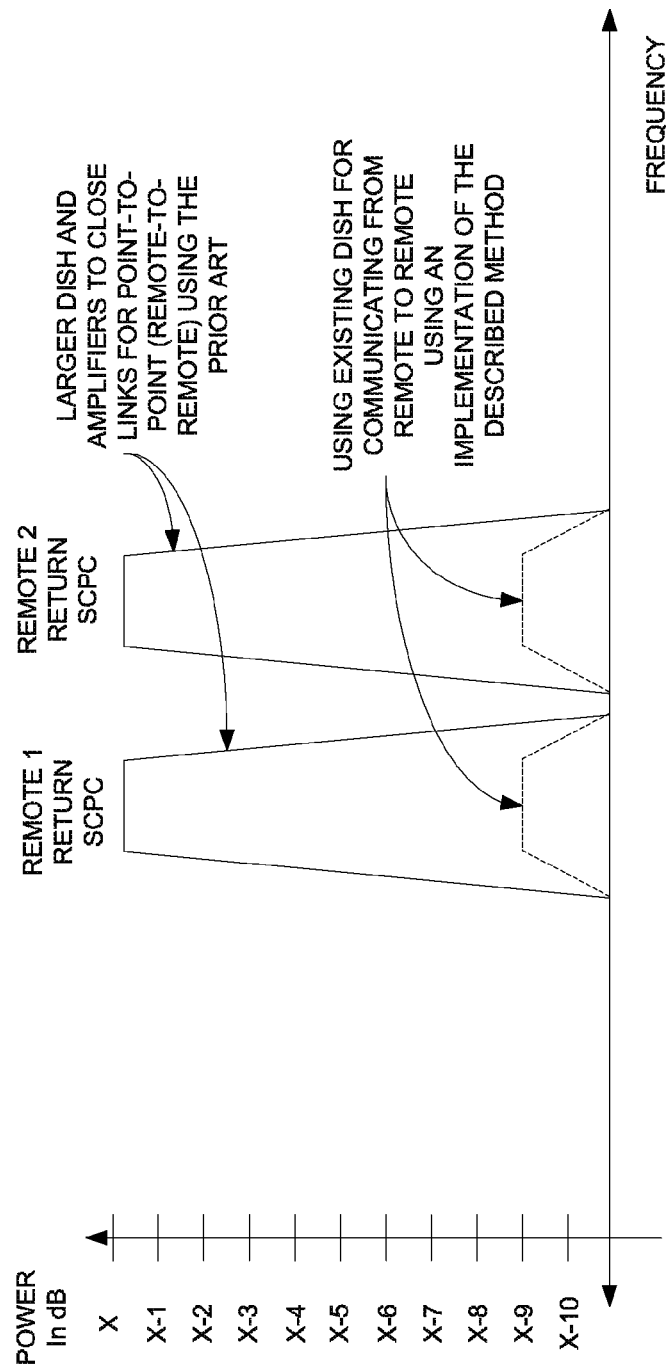
FIG. 4 is a representation of the prior art and spectrum required to support point-to-point SCPC Continuous Coding and Modulation (CCM) to support communications from one remote terminal to another remote terminal.

FIG. 3 illustrates a prior art configuration in which a remote terminal may directly communicate with another remote terminal. To support this type of communication, the remote VSAT terminals 300, 310 are specifically design with larger antennas and more powerful and sensitive electronics to support these types of communications. FIG. 4 shows the spectrum required for remote VSAT 1 300 to communicate to remote VSAT 2 310 is the same (i.e. the bandwidth is the same as in FIG. 2), but the power levels must be increased to close the link between the remote terminals. To support remote-to-remote communications, the earth stations are typically designed with larger antennas, larger power amplifiers and more sensitive electronics for reception. In lieu of installing more powerful and sensitive equipment, an alternative is to transmit more power. The increase of power to achieve any level of communications may be on the order of four (6 dB) or eight times (9 dB) to establish communications. These power requirements are illustrated in FIG. 4, since the relative power (amplitude) of each carrier signal is physically larger, thus requiring more power from the repeating relay (satellite's transponder). Using an implementation of the described method does not require any enhancements to the size of the antenna, amplifier or sensitivity, and most importantly, does not require more power from the repeating relay. Instead, the remote terminal's equipment remains the same and the power requirements through the system remain nearly constant.

Thus, when utilizing implementations of the described method, latency in the communications link is greatly reduced because the remote terminals are able to speak directly with each other rather than going through the hub to communicate with each other as in the prior art. This elimination of the double hop previously required for remote-to-remote communications reduces latency by approximately 50% as a result of using the remote terminals' native communication channels for remote-to-remote communications.

Figure 5:
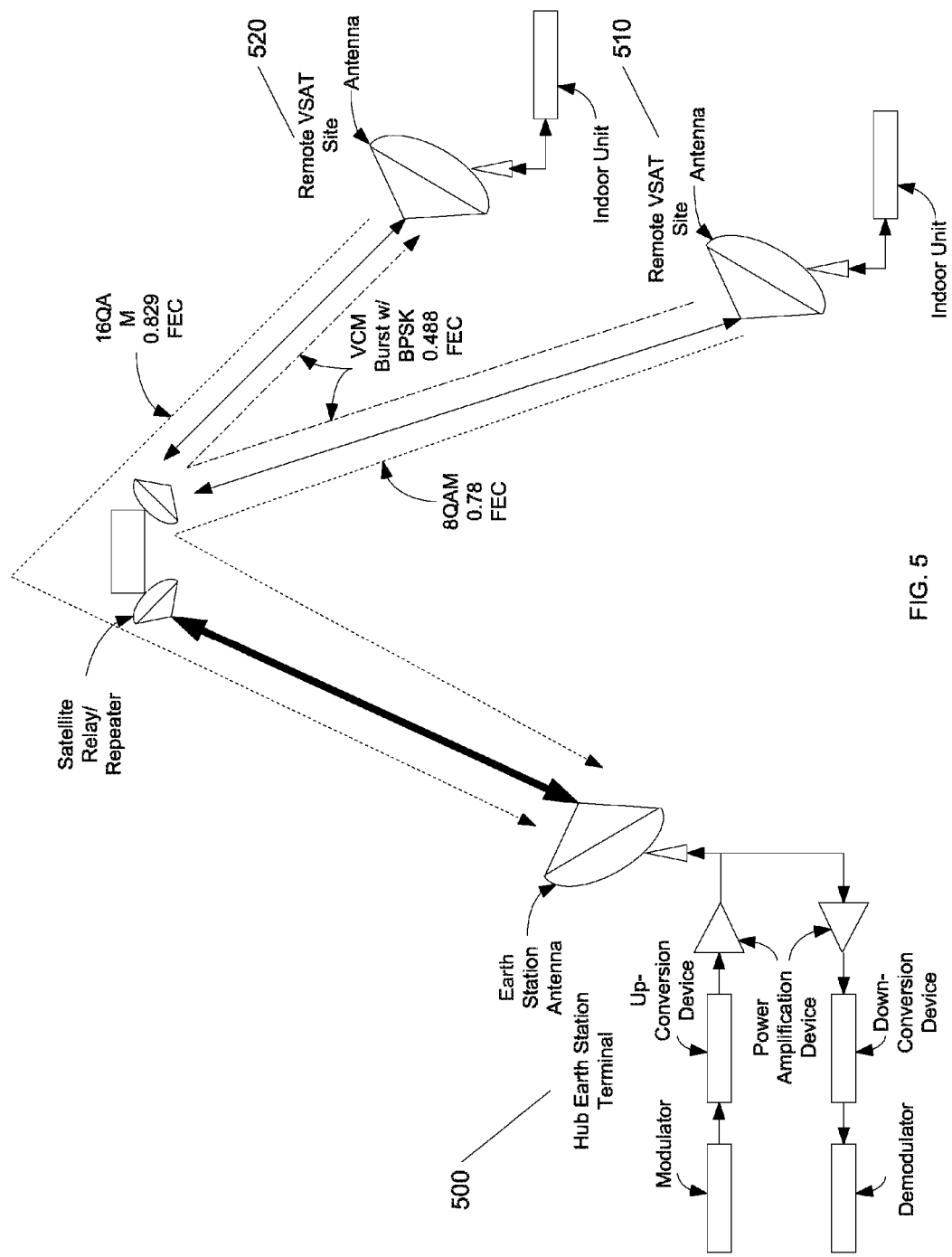
FIG. 5 is a representation of an implementation of a method in which ACM is used by a remote terminal with FEC coding gain to continuously communicate with a hub earth station and another remote terminal.

FIG. 5 shows a common hub earth station 500 providing a common carrier signal to the remote terminals 510, 520 and the remote terminals have a dedicated SCPC return channel to the hub earth station 500. When a message must flow from the remote terminal 510, 520 to the hub earth station 500, a MODCOD is used that ensures the hub earth station 500 can demodulate the message, but this message cannot be decoded by another remote terminal. With the introduction of ACM, the MODCOD may be dynamic, so if a MODCOD with a low enough modulation index and high enough FEC is appropriately selected, then another remote terminal with the appropriate receiving hardware can be capable of receiving the communications. An aspect of novelty in this disclosure is that both the hub earth station 500 and a remote terminal, group of remote terminals, or all remote terminals may receive the message from a remote terminal if the MODCOD is appropriately selected. Through the use of ACM, communications may continue between the remote terminal and the hub earthbound station (inbound) and a message may be sent to another remote terminal without re-tuning to a new frequency or symbol rate. While FIG. 5 depicts specific examples of selected MODCODs, one of ordinary skill in the art will recognize that this disclosure is not intended to be limited as such and any appropriate MODCODs may be selected and used.

Figure 6:
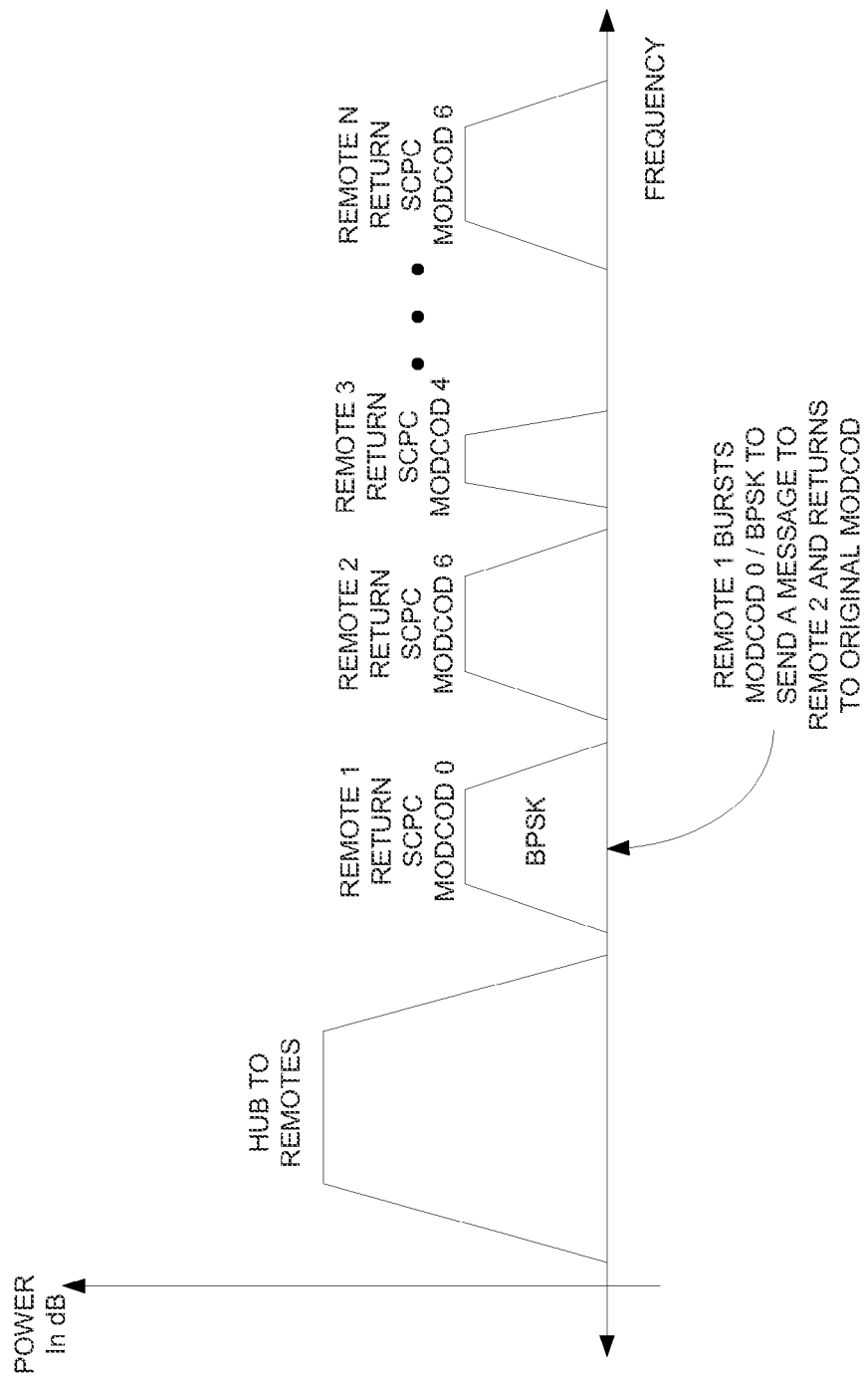
FIG. 6 is a representation of a spectrum for an implementation of a method in which a MODCOD is dynamically switched to a MODCOD that allows communication from a remote terminal to both a hub earth station and another remote terminal.

FIG. 6 provides a representation of the spectrum used for an implementation of the described method in which the MODCOD is dynamically switched to a MODCOD that allows a remote terminal to communicate with both the hub earth station (point) and at least one other remote terminal. While communicating with the hub earth station on a higher MODCOD, other remotes may not receive the communications.

Implementations of the described methods use ACM techniques, but are not considered to utilize ACM in the traditional sense. These "ACM-like" capabilities only exist from the hub earth station's perspective in that the hub earth station is a collection point for the entire remote population and collects information about each remote terminal as to which channel (center frequency, symbol rate, Es/No, link performance, etc.) is occupied and distributes this information to every remote terminal in the network, so that each remote terminal knows information about each and every remote terminal in the network should remote-to-remote communications with another remote terminal site be desired.

Since link characteristics are dynamic, the ability for a remote terminal to send information from one remote terminal to another remote terminal may be unrealistic at higher MODCODs. Implementations of the described method may start with the lowest MODCOD which provides the greatest chance to close the link between remote terminals. Once the link is established between the remote terminals and based on the received Es/No between the sites, the MODCOD may be increased to improve performance, but unlike standard ACM, the actual control of the MODCODs is exchanged between the remote terminals that are communicating using the described method. An aspect of novelty of particular implementations of the described methods may include that communication with the hub earth station is not required as would be required for ACM. The described methods are not limited to only two remote terminals communicating and may include a group of remote terminals or all remote terminals communicating in remote-to-remote fashion while continuing communication with the hub earth station's demodulators.

Figure 7:
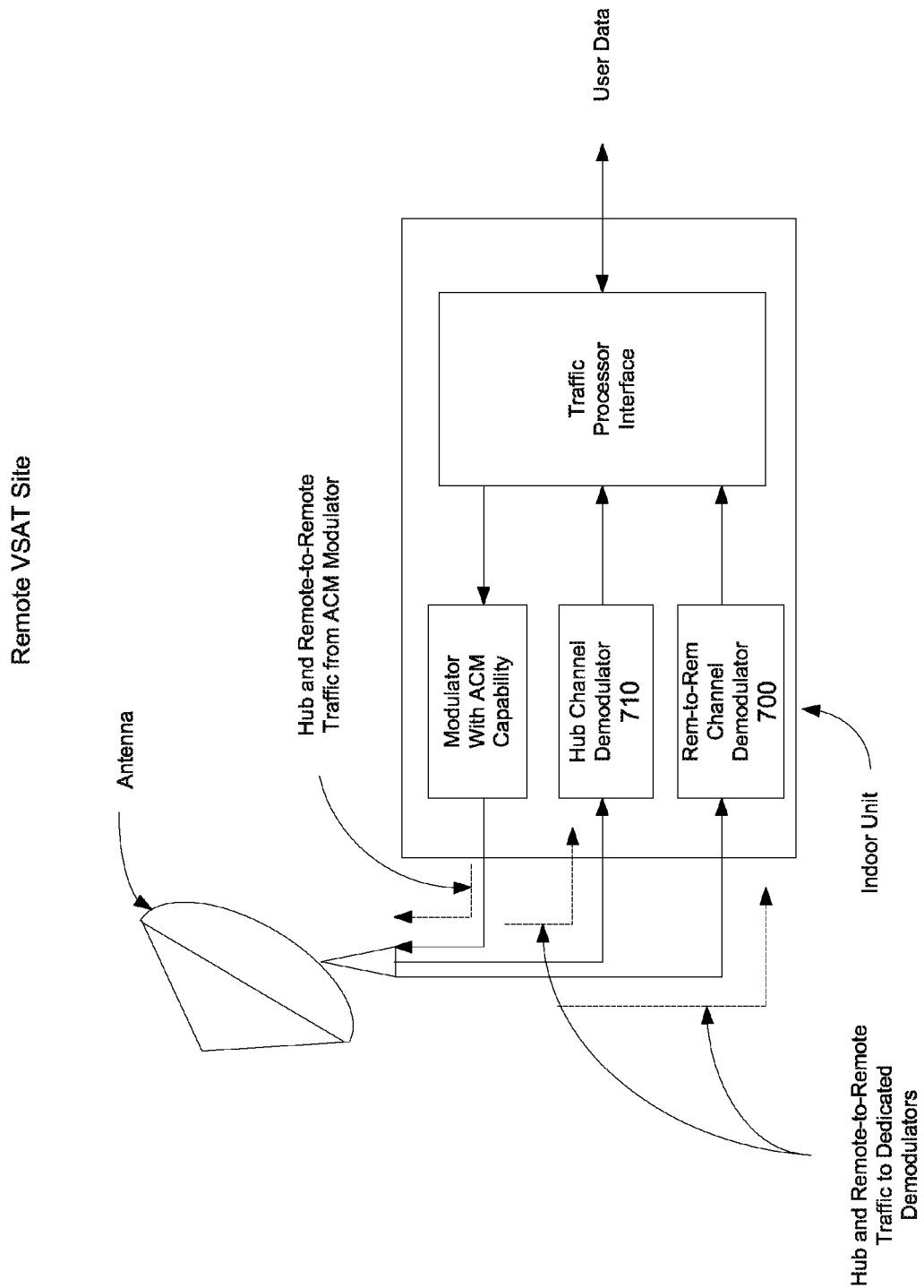
FIG. 7 is a representation of an implementation of a remote terminal configuration having a dedicated receiver section in the remote terminal for receiving remote-to-remote communications.
Figure 8:
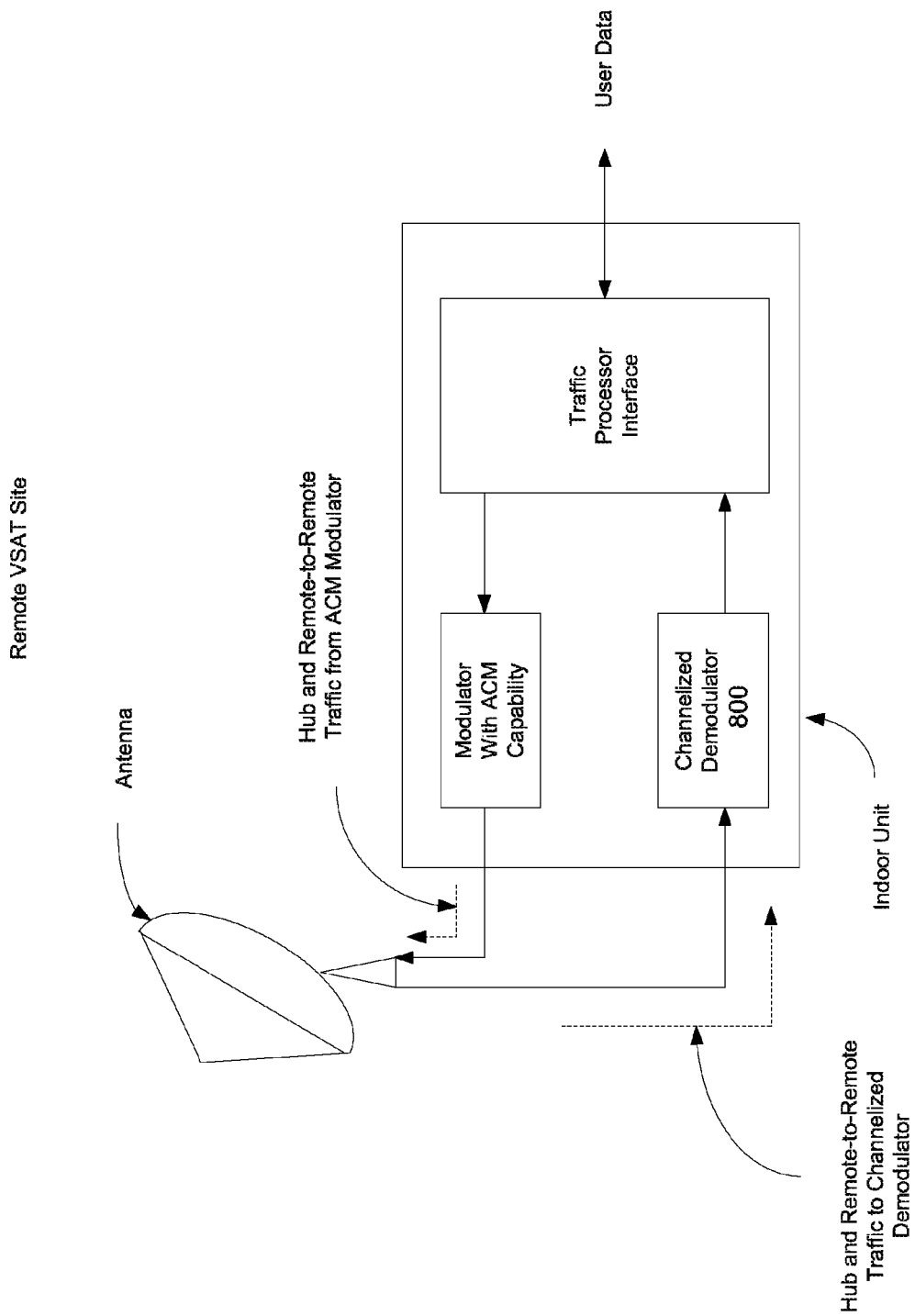
FIG. 8 is a representation of an implementation of a remote terminal configuration that has a channelized receiver in the remote terminal for receiving remote-to-remote communications.
Figure 9:
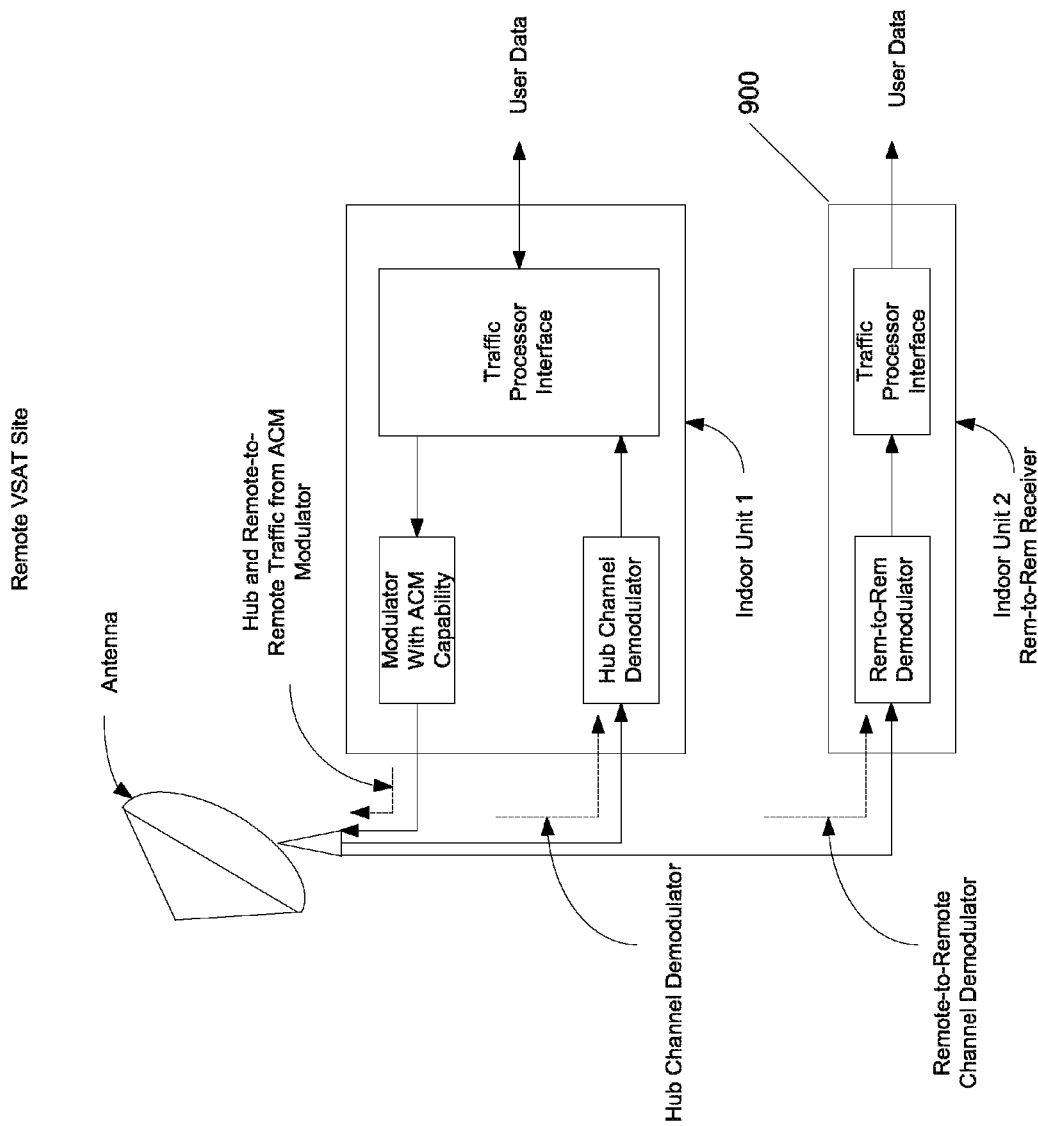
FIG. 9 is a representation of an implementation of a remote terminal configuration that has a dedicated receiver section that is external to the remote terminal for receiving remote-to-remote communications.

FIG. 7 shows a remote terminal configuration using an implementation of the described method in which the remote terminal has a dedicated demodulator/decoder 700 for receiving the remote-to-remote traffic. The hub earth station channel demodulator 710 may be tuned to the hub earth station's outbound carrier signal and the remote-to-remote channel demodulator 700 may be tuned to a desired remote terminal and performing remote-to-remote communications. FIG. 8 shows another embodiment that uses a channelized demodulator 800 and wherein the hub earth station and one or many carrier signals from one or more remote terminals may be received by the same receiving hardware. FIG. 9 shows another embodiment that uses a dedicated external receiver 900 for receiving the remote-to-remote communications. As can be observed, the number of channel demodulators is not limited to one as a plurality of receiving demodulators may also be used.

While implementations of the described method are shown for SCPC carrier signals that are implemented with ACM (for variable rate coding of the MODCODs), the described methods are not limited to only SCPC type carrier signals and may be comprised of, but are not limited to Time-Division Multiple Access (TDMA), Code Division Multiple Access (CDMA), or any other appropriate type of carrier signals.

The selection of the appropriate MODCOD is determined by performing a link-budget analysis (LBA) that takes the size of the antenna, sensitivity of the electronics, power capabilities of the amplifiers, and path loss through the atmosphere and determines if the link may be closed. To compensate for path loss, a modulation index may be lowered or more coding gain may be applied in the form of FEC to overcome the degradation of path loss. FIG. 11 provides a table in which the appropriate MODCOD may be selected to overcome link losses. For remote to hub communication, a typical MODCOD 7 with 8-QAM (with a modulation index of 3) and an FEC of 0.780, and will close the link between the remote and the hub. Using implementations of the described methods, while transmitting to the hub earth station with MODCOD 7 (Es/No requirement of 9.292 dB), if a message needs to be sent to another remote terminal, a MODCOD of 0 (Es/No requirement of −0.716 dB) which has 9.292 dB−(−0.716 dB)=10.008 dB improvement in the link just by adjusting the MODCOD. For the duration the remote terminals are sending the messages to another remote terminal, the MODCOD may remain lower—during the time the remote terminal is in a lower MODCOD, the hub may simultaneously receive the remote-to-remote communication. While FIG. 11 shows the performance of a FEC known as VersaFEC, the described method is not limited to any particular FEC and may work with, but is not limited to Low Density Parity Checking (LDPC), Turbo Product Codes (TPC), Viterbi, etc.

Figure 10:
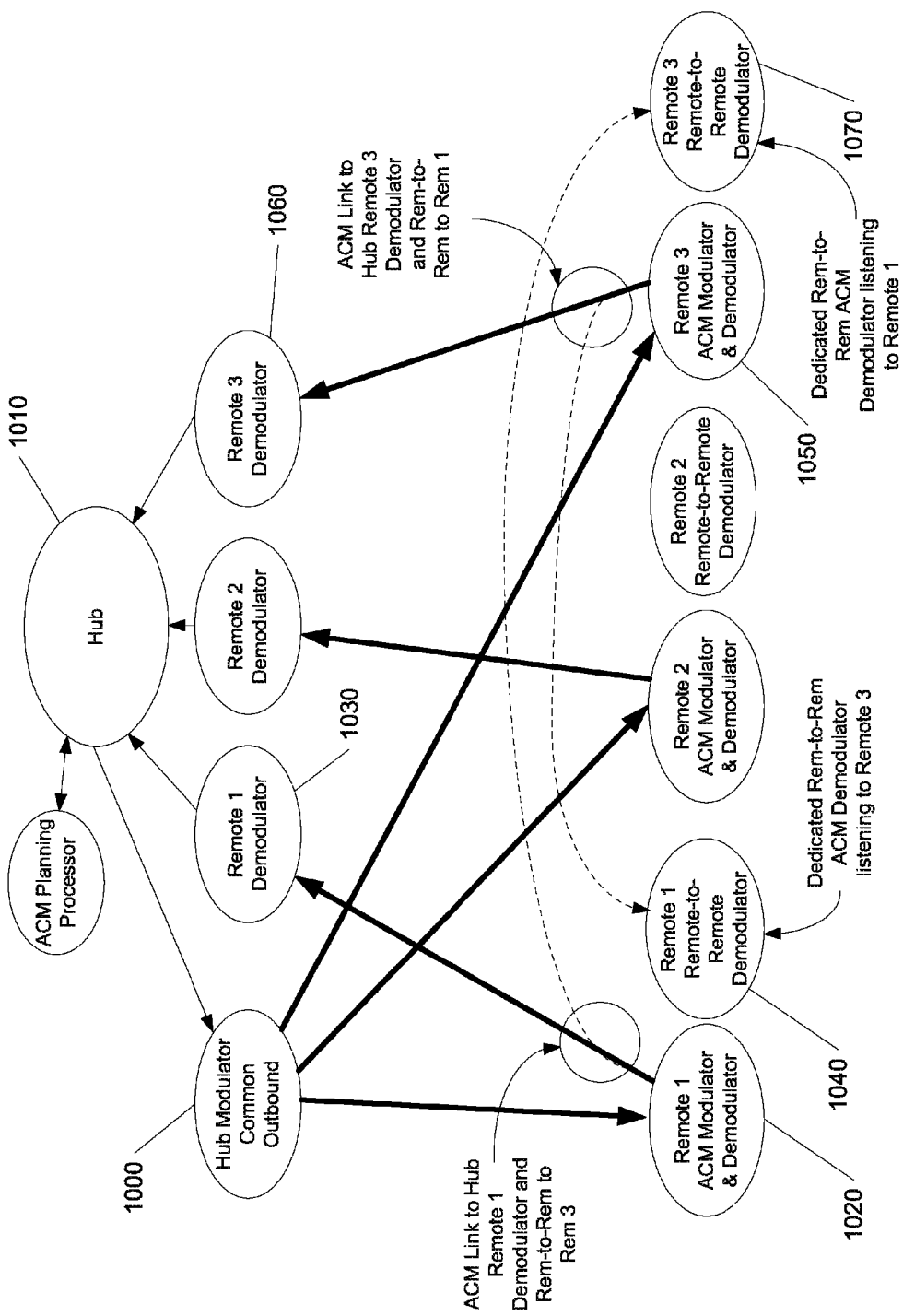
FIG. 10 is flow diagram showing a three-site network in which the hub earth station and remote terminals are connected and communicating using an implementation of the described method.

In a particular implementation, FIG. 10 shows how all remotes are connected (listening) to the hub earth station modulator (common outbound) 1000 and each remote terminal is connected to the hub earth station 1010 with dedicated hardware. Remote Terminal 1 uses an implementation of the described method to transmit from the Remote Terminal 1 ACM Modulator 1020 to the hub earth station's Remote Terminal 1 Demodulator 1030, and using ACM with an implementation of the described method, communicates with Remote Terminal 1's Remote-to-Remote Demodulator 1040. Remote Terminal 3 uses an implementation of the described method to transmit from the Remote 3 ACM modulator 1050 to the hub earth station's Remote Terminal 3 Demodulator 1060 and using ACM with an implementation of the described method, communicates with Remote Terminal 3's remote-to-remote demodulator 1070. The ability for Remote Terminal 1 to communicate directly with Remote Terminal 3 demonstrates an aspect of novelty of this disclosure. In an alternate embodiment, the remote terminal demodulators may be a single demodulator supporting, but not limited to TDMA or CDMA.

The following are particular implementations of a method and system for ACM for supporting mesh network connectivity for multipoint networks techniques are provided as non-limiting examples:

EXAMPLE 1

A Ku-Band satellite network is configured to operate using an implementation of the described method. A network comprised of 15 remote VSATs is configured with a 1.8 m dish with a 4 Watt BUC to support data transmission. All remote terminals are configured to receive the hub earth station's outbound "common" carrier signal. All remote terminals are configured to communicate back to the hub earth station with the same MODCOD (9) as 16-QAM and FEC 0.780. Additionally, each remote terminal has the ability to receive another remote terminal's channels. One remote terminal would like to send a 100-byte IP packet to a second remote terminal using an implementation of the described method.

While communicating with the hub earth station, one remote terminal has a message to send to a second remote terminal. While operating at MODCOD 9, the 100-byte message is sent to a second remote terminal using MODCOD 0 (BPSK 0.488 FEC) and then returns to MODCOD 9 to resume communications to the hub earth station at the higher MODCOD. The hub earth station receives both normal (MODCOD 9) and remote-to-remote communications (MODCOD 0), thus completing the transaction of remotely sending a message directly from one remote terminal to another remote terminal.

EXAMPLE 2

In particular implementations of the system described in Example 1, a network is designed with 2.4 m antennas and uses MODCOD 11 for normal operation. One remote terminal would like to send a 1,000-byte message to a subset of remote terminals in the network. The remote then lowers the MODCOD from 11 and then sends the message using MODCOD 0 to a subset of remote terminals in the network.

EXAMPLE 3

In particular implementations of the system described in Example 1, a network is designed with 2.4 m antennas and uses MODCOD 11 for normal operation. One remote terminal would like to send a 1,000-byte message to all remote terminals in the network. The remote terminal then lowers the MODCOD from 11 and then sends the message using MODCOD 0 to all remote terminals in the network.

EXAMPLE 4

A C-Band satellite network is configured to operate using an implementation of the described method. A network of 15 remote VSATs is configured with a 3.6 m dish with a 20 Watt BUC to support data. All remote terminals are configured to receive the hub earth station's outbound "common" carrier signal. All remote terminals are configured to communicate back to the hub earth station with the same MODCOD (5) as 8-QAM and FEC 0.642. Additionally, each remote terminal has the ability to receive another remote terminal's return channels. One remote terminal would like to send a 500-byte IP packet to a second remote terminal using an implementation of the described method. While communicating with the hub earth station, the remote terminal has a message to send to a second remote terminal. While operating at MODCOD 5, the 500-byte message is sent to a second remote terminal using MODCOD 0 (BPSK 0.488 FEC) and then returns to MODCOD 5 to resume communications to the hub earth station at the higher MODCOD. The hub earth station receives both normal and remote-to-remote communications, thus completing the transaction of remotely sending a message to another remote terminal. At the hub earth station, upon receipt of a remote-to-remote frame/packet/stream, the hub earth station silently discards the data.

EXAMPLE 5

In particular implementations of the system described in Example 4, a network is designed with 3.6 m antennas and uses MODCOD 11 for normal operation. One remote terminal would like to send a 50-byte message to a subset of remote terminals in the network. The remote terminal then lowers the MODCOD from 11 and then sends the message using MODCOD 0 to a subset of remote terminals in the network.

EXAMPLE 6

In particular implementations of the system described in Example 4, a network is designed with 3.6 m antennas and uses MODCOD 11 for normal operation. One remote terminal would like to send a 900-byte message to all remote terminals in the network. The remote terminal then lowers the MODCOD from 11 and then sends the message using MODCOD 0 to all remote terminals in the network.

EXAMPLE 7

A Ka-Band satellite network is configured to operate using an implementation of the described method. A network comprised of 15 remote VSATs is configured with a 1.2 m dish with a 4 Watt BUC to support data. All remote terminals are configured to receive the hub earth station's outbound "common" carrier signal. All remote terminals are configured to communicate back to the hub with the same MODCOD (11) as 16-QAM and FEC 0.853. Additionally, each remote terminal has the ability to receive another remote terminal's return channels. One remote terminal would like to send a 32 kbps voice stream to a second remote terminal using a described method. While communicating with the hub, the remote terminal has a message to send to a second remote terminal. While operating at MODCOD 11, the 32-kbps voice stream is sent to a second remote terminal using MODCOD 0 (BPSK 0.488 FEC) and then returns to MODCOD 11 as available time is found in the communication to resume communications to the hub earth station at the higher MODCOD. The hub earth station receives both normal and remote-to-remote communications, and sending a voice stream to another remote terminal. At the hub earth station, upon receipt of a remote-to-remote frame/packet/stream, the hub earth station silently discards the data.

EXAMPLE 8

A C-Band satellite network is configured to operate using an implementation of the described method. The network is comprised of 15 remote VSATs and is configured with a 2.4 m dish with an 8 Watt BUC to support connections to cellular base stations known as Base Transceiver Station (BTS). All remote terminals are configured to receive the hub earth station's outbound "common" carrier signal. All remote terminals are configured to communicate back to the hub earth station with the same MODCOD (11) as 16-QAM and FEC 0.853. Additionally, each remote terminal has the ability to receive the hub earth station's common outbound carrier signal and all other remote terminal's return channels based on the link configuration. The hub earth station broadcasts each remote terminal's configuration when communicating back to the hub earth station, so all remote terminals know how to contact another remote terminal directly if a remote-to-remote call is desired. One remote terminal (BTS) would like to open a two-way voice stream to a second remote terminal using an implementation of the described method. While communicating with the hub earth station, one BTS knows where to contact the second remote terminal and sends a signaling message on MODCOD 0 (BPSK 0.488 FEC). The two remote terminals exchange signal messages and it is determined that one can operate at MODCOD 1 (QPSK 0.533 FEC) and the second at MODCOD 2 (QPSK 0.631 FEC). They both use the highest capable MODCOD and then open a voice channel while operating at MODCOD 11 for communicating to the hub earth station. Once the remote-to-remote call is complete, it is terminated and the remote terminal returns to only using MODCOD 11 to the hub earth station.

EXAMPLE 9

In particular implementations of the system described in Example 8, a network is designed with 3.6 m antennas and uses MODCOD 11 for normal operation. One remote terminal would like to send a 900-byte message to all remote terminals in the network. The remote terminal would like to send a message to a second remote terminal, but before the link is opened, a new message is received from the hub ACM process that the target remote terminal has moved center frequencies to the hub. The source remote terminal re-adjusts the remote-to-remote demodulator to receive a message on a new center frequency. The remote terminal then lowers the MODCOD from 11 to 0 and then sends the message using MODCOD 0 to the target remote terminal.

EXAMPLE 10

In particular implementations of the system described in Example 8, a network is designed with 1.8 m antennas and uses MODCOD 7 for normal operation. One remote terminal would like to send a 100-byte message to a second remote terminal in the network. The remote terminal would like to send a message to a second remote terminal, but before the link is opened, a new message is received from the hub earth station ACM processor that the target remote terminal has moved symbol rates to the hub earth station. The source remote terminal re-adjusts the remote-to-remote demodulator to receive a message at a new symbol rate. The remote terminal then lowers the MODCOD from 7 to 0 and then sends the message using MODCOD 0 to the target remote terminal.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method of provisioning a communications link between remote terminals within a hub-spoke network, the method comprising:
receiving, by a first remote terminal, information about a second remote terminal from a hub;
selecting, by the first remote terminal, a modulation factor, coding rate, symbol rate, center frequency, and power level based on the information received about the second remote terminal;
transmitting, by the first remote terminal, a signal using at least one of the selected modulation factor, coding rate, symbol rate, center frequency, and power level, to the second remote terminal such that a communications link is created; and
adjusting at least one of the symbol rate and center frequency of the transmitted signal such that performance of the link is increased while maintaining a presence of the link;
wherein signals sent by a hub to the remote terminals are sent through a common outbound channel and signals sent by the remote terminals to the hub are sent through one or more single channel per carrier (SCPC) channels.

2. The method of claim 1, wherein outbound communications from the hub natively exist between the hub and one or more remote terminals.

3. The method of claim 1, wherein inbound communications received by the hub natively exist between one or more remote terminals and the hub.

4. The method of claim 1, further comprising:
transmitting, by the first remote terminal, a signal to the hub; and
adjusting, by the first remote terminal, a modulation factor, coding rate, symbol rate, center frequency, or power level such that a communications link is created between the first and second remote terminals.

5. The method of claim 4, wherein the second remote terminal further comprises a dedicated receiving circuit configured to receive the signal from the first remote terminal.

6. The method of claim 4, wherein the second remote terminal further comprises a dedicated receiving device configured to receive the signal from the first remote terminal.

7. The method of claim 4, wherein the second remote terminal further comprises a channelized or adaptive coding and modulation (ACM) receiving circuit configured to receive the signal from the first remote terminal.

8. The method of claim 1, wherein the adjustment utilizes an adaptive coding and modulation format.

9. The method of claim 1, wherein a symbol rate and bandwidth of the transmitted signal remain constant.

10. The method of claim 1, further comprising transmitting a complete data message from the first remote terminal to the second remote terminal using a constant modulation factor, coding rate, center frequency, and power level during the transmission.

11. The method of claim 1, further comprising periodically changing the modulation factor, coding rate, center frequency, and power level between a first configuration and a second configuration during transmission of a data message from the first remote terminal to the second remote terminal.

12. A method of communicating between remote terminals within a hub-spoke network, the method comprising:
receiving, by a hub, information about a plurality of remote terminals indicating communications link requirements of each remote terminal;
receiving, by a first remote terminal of the plurality of remote terminals, information about a second remote terminal of the plurality of remote terminals from the hub;
selecting, by the first remote terminal, a modulation factor, coding rate, symbol rate, center frequency, and power level based on the information received about the second remote terminal;
transmitting, by the first remote terminal, a signal using at least one of the selected modulation factor, coding rate, symbol rate, center frequency, and power level, to the second remote terminal such that a communications link is created; and
adjusting at least one of the symbol rate and center frequency of the transmitted signal such that performance of the link is increased while maintaining a presence of the link;
wherein signals sent by a hub to the remote terminals are sent through a common outbound channel and signals sent by the remote terminals to the hub are sent through one or more single channel per carrier (SCPC) channels.

13. The method of claim 12, further comprising:
transmitting, by the first and second remote terminals, link quality information to the hub; and determining, by the first or second remote terminal, an estimated modulation factor, coding rate, symbol rate, center frequency, and power level necessary to maintain the link between the first and second remote terminals.

14. The method of claim 12, further comprising:
transmitting, by the first and second remote terminals, link quality information to the hub; and
determining, by the hub, an estimated modulation factor, coding rate, symbol rate, center frequency, and power level necessary to maintain the link between the first and second remote terminals.

15. The method of claim 12, further comprising storing the information received by the hub into a storage device.

16. The method of claim 12, further comprising transmitting, by the hub, information about the communication link requirements of a remote terminal to other remote terminals among the plurality of remote terminals such that each remote terminal has information about a modulation factor, coding rate, symbol rate, center frequency, and power level required to create a link between itself and another remote terminal.

17. The method of claim 12, further comprising simultaneously transmitting the signal from the first remote terminal to the second remote terminal and from the first remote terminal to the hub.

18. The method of claim 12, further comprising:
periodically receiving updated information about the communications link requirements of each remote terminal by the hub; and
transmitting, by the hub, the updated information to the plurality of remote terminals.

19. A method of communicating between remote terminals within a hub-spoke network, the method comprising:
receiving, by a hub, a request from a first remote terminal to establish a communications link with a second remote terminal;
transmitting to the second remote terminal, by the hub, information regarding a modulation factor, coding rate, symbol rate, center frequency, and power level of an expected message sent from the first remote terminal to the second remote terminal;
transmitting, by the first remote terminal, a signal to the second remote terminal such that a communications link is created; and
adjusting at least one of the symbol rate and center frequency of the transmitted signal such that performance of the link is increased while maintaining a presence of the link;
wherein signals sent by a hub to the remote terminals are sent through a common outbound channel and signals sent by the remote terminals to the hub are sent through one or more single channel per carrier (SCPC) channels.

20. The method of claim 19, further comprising determining by the hub which remote terminals among a plurality of remote terminals have access to establish a communications link with one or more other remote terminals within the plurality of remote terminals.

21. The method of claim 20, further comprising:
transmitting, by the first remote terminal, a message to the hub requesting the second remote terminal to configure a receiving circuit to receive a message from the first remote terminal; and
relaying, by the hub, the message to the second remote terminal.

22. The method of claim 20, further comprising:
transmitting, by the first remote terminal, a message to the hub requesting that two or more remote terminals among the plurality of remote terminals configure a receiving circuit to receive a message from the first remote terminal; and
relaying, by the hub, the message to the two or more remote terminals.

23. The method of claim 20, further comprising:
transmitting, by the first remote terminal, a message to the hub requesting that all of the other remote terminals among the plurality of remote terminals configure a receiving circuit to receive a message from the first remote terminal; and
relaying, by the hub, the message to all of the other remote terminals.

24. A method of communicating between remote terminals within a hub-spoke network, the method comprising:
transmitting, by a first remote terminal, a signal using a modulation factor, coding rate, center frequency, and power level selected based on a priori information about communications link requirements of a second remote terminal such that a communications link is created without communicating with a hub; and
adjusting at least one of the symbol rate and center frequency of the transmitted signal such that performance of the link is increased while maintaining a presence of the link;
wherein signals sent by a hub to the remote terminals are sent through a common outbound channel and signals sent by the remote terminals to the hub are sent through one or more single channel per carrier (SCPC) channels.

25. The system of claim 24, wherein the first remote terminal is further configured to transmit a complete data message from the first remote terminal to the second remote terminal using a constant modulation factor, coding rate symbol rate, center frequency, and power level during the transmission.

26. A system for communicating between remote terminals within a hub-spoke network, the system comprising:
a hub configured to transmit information about a second remote terminal; and
a first remote terminal configured to:
receive the information about the second remote terminal from the hub;
select a modulation factor, coding rate, symbol rate, center frequency, and power level based on the information received about the second remote terminal;
transmit a signal using at least one of the selected modulation factor, coding rate, symbol rate, center frequency, and power level, to the second remote terminal such that a communications link is created; and
adjust at least one of the symbol rate and center frequency of the transmitted signal such that performance of the link is increased while maintaining a presence of the link;
wherein the hub is further configured to send the signals to the remote terminals through a common outbound channel and the remote terminals are configured to send signals to the hub are sent through one or more single channel per carrier (SCPC) channels.

27. The system of claim 26, wherein outbound communications from the hub natively exist between the hub and one or more remote terminals.

28. The system of claim 26, wherein inbound communications received by the hub natively exist between one or more remote terminals and the hub.

29. The system of claim 26, wherein the first remote terminal is further configured to transmit a signal to the hub.

30. The system of claim 29, wherein the second remote terminal further comprises a dedicated receiving circuit configured to receive the signal from the first remote terminal.

31. The system of claim 29, wherein the second remote terminal further comprises a dedicated receiving device configured to receive the signal from the first remote terminal.

32. The system of claim 29, wherein the second remote terminal further comprises a channelized or adaptive coding and modulation (ACM) receiving circuit configured to receive the signal from the first remote terminal.

33. The system of claim 26, wherein the first remote terminal is further configured to adjust the modulation factor, coding rate, center frequency, or power level using an adaptive coding and modulation format.

34. The system of claim 26, wherein a symbol rate and bandwidth of the transmitted signal remain constant.

35. The system of claim 26, wherein the first remote terminal is further configured to periodically change the modulation factor, coding rate, symbol rate, center frequency, and power level between a first configuration and a second configuration during transmission of a data message from the first remote terminal to the second remote terminal.

36. A system for communicating between remote terminals within a hub-spoke network, the system comprising:
  a hub configured to receive information about a plurality of remote terminals indicating communications link requirements of each remote terminal; and
  a first remote terminal configured to:
    receive the information about a second remote terminal from the hub;
    select a modulation factor, coding rate, symbol rate, center frequency, and power level based on the information received about the second remote terminal;
    transmit a signal using at least one of the selected modulation factor, coding rate, symbol rate, center frequency, and power level, to the second remote terminal such that a communications link is created; and
    adjust at least one of the modulation symbol rate and center frequency of the transmitted signal such that performance of the link is increased while maintaining a presence of the link;
    wherein the hub is further configured to send the signals to the remote terminals through a common outbound channel and the remote terminals are configured to send signals to the hub are sent through one or more single channel per carrier (SCPC) channels.

37. The system of claim 36, wherein the first and second terminals are further configured to transmit link quality information to the hub and determine an estimated modulation factor, coding rate, symbol rate, center frequency, and power level necessary to maintain the link between the first and second remote terminals.

38. The system of claim 36, further comprising a storage device configured to store the information received by the hub.

39. The system of claim 36, wherein the hub is further configured to transmit information about the communication link requirements of a remote terminal to other remote terminals among the plurality of remote terminals such that each remote terminal has information about a modulation factor, coding rate, symbol rate, center frequency, and power level required to create a link between itself and another remote terminal.

40. The system of claim 36, wherein the first remote terminal is further configured to simultaneously transmit the signal to the second remote terminal and to the hub.

41. The system of claim 36, wherein the hub is further configured to periodically receive updated information about the communications link requirements of each remote terminal and transmit the updated information to the plurality of remote terminals.

42. A system for communicating between remote terminals within a hub-spoke network, the system comprising:
  a hub;
  a first remote terminal; and
  a second remote terminal;
    wherein the hub is configured to receive a request from the first remote terminal to establish a communications link with the second remote terminal and transmit to the second remote terminal information about a modulation factor, coding rate, symbol rate, center frequency, and power level of an expected message sent from the first remote terminal to the second remote terminal; and
    wherein the first remote terminal is configured to:
      transmit a signal using at least one of the selected modulation factor, coding rate, symbol rate, center frequency, and power level, to the second remote terminal such that a communications link is created; and
      adjust at least one of the symbol rate and center frequency of the transmitted signal such that performance of the link is increased while maintaining a presence of the link;
    wherein the hub is further configured to send the signals to the remote terminals through a common outbound channel and the remote terminals are configured to send signals to the hub are sent through one or more single channel per carrier (SCPC) channels.

43. The system of claim 42, wherein the hub is further configured to determine which remote terminals among a plurality of remote terminals have access to establish a communications link with one or more other remote terminals within the plurality of remote terminals.

44. The system of claim 43, wherein the first remote terminal is further configured to transmit a message to the hub requesting the second remote terminal to configure a receiving circuit to receive a message from the first remote terminal and the hub is further configured to relay the message to the second remote terminal.

45. The system of claim 43, wherein the first remote terminal is further configured to transmit a message to the hub requesting that two or more remote terminals among the plurality of remote terminals configure a receiving circuit to receive a message from the first remote terminal and the hub is further configured to relay the message to the two or more remote terminals.

46. The system of claim 43, wherein the first remote terminal is further configured to transmit a message to the hub requesting that all of the other remote terminals among the plurality of remote terminals configure a receiving circuit to receive a message from the first remote terminal and the hub is further configured to relay the message to all of the other remote terminals.

47. The system of claim 42, wherein at least one of the first and second terminals is further configured to determine which remote terminals among a plurality of remote terminals have access to establish a communications link with one or more other remote terminals within the plurality of remote terminals.

48. A system for communicating between remote terminals within a hub-spoke network, the system comprising:
  a hub;
  a first remote terminal; and a second remote terminal;
- wherein the first remote terminal is configured to transmit a signal using a modulation factor, coding rate, center frequency, and power level selected based on a priori information about communications link requirements of the second remote terminal such that a communications link is created without communicating with the hub;
- wherein the first remote terminal is further configured to adjust at least one of the symbol rate and center frequency of the transmitted signal such that performance of the link is increased while maintaining a presence of the link; and
- wherein the hub is further configured to send the signals to the remote terminals through a common outbound channel and the remote terminals are configured to send signals to the hub are sent through one or more single channel per carrier (SCPC) channels.

* * * * *